Nov. 25, 1952  R. M. BERGSTEIN  2,619,275
FOLDING BOX EMPLOYING NONSCORABLE SHEETING
Filed Jan. 6, 1947  6 Sheets-Sheet 2

INVENTOR.
ROBERT MORRIS BERGSTEIN.
BY Allen & Allen
ATTORNEYS.

Nov. 25, 1952 R. M. BERGSTEIN 2,619,275
FOLDING BOX EMPLOYING NONSCORABLE SHEETING
Filed Jan. 6, 1947 6 Sheets-Sheet 4

INVENTOR.
ROBERT MORRIS BERGSTEIN.
BY Allen & Allen
ATTORNEYS.

Nov. 25, 1952 R. M. BERGSTEIN 2,619,275
FOLDING BOX EMPLOYING NONSCORABLE SHEETING
Filed Jan. 6, 1947 6 Sheets-Sheet 5

INVENTOR.
Robert Morris Bergstein.
BY
Allen & Allen
ATTORNEYS.

Nov. 25, 1952

R. M. BERGSTEIN 2,619,275

FOLDING BOX EMPLOYING NONSCORABLE SHEETING

Filed Jan. 6, 1947

INVENTOR.
ROBERT MORRIS BERGSTEIN.
BY
Allen & Allen
ATTORNEYS.

Patented Nov. 25, 1952

2,619,275

UNITED STATES PATENT OFFICE 2,619,275

FOLDING BOX EMPLOYING NONSCORABLE SHEETING

Robert Morris Bergstein, Cincinnati, Ohio

Application January 6, 1947, Serial No. 720,407

8 Claims. (Cl. 229—31)

My invention relates to the formation of collapsible or knock-down boxes having a plurality of panels of "sheeting," and hence requiring hinged articulation between the panels. By "sheeting" I mean relatively stiff substances, cellulosic or resinous, which are incapable of being scored to produce lines of hinged articulation. Such substances are usually though not necessarily transparent; and they are thermoplastic and capable of being bent under heat. This quality has hitherto enabled the art to produce set-up containers or boxes, but at high cost both in manufacture and in shipment and storage. Cellulose acetate sheeting is a non-limitative example of a "sheeting" to which this invention may be applied.

The fundamental objects of the invention are the provision of new and improved collapsible or folding structures consisting of panels of sheeting with articulated structures of other materials such as boxboard, and the provision of modes of manufacture and apparatus for the making of such boxes.

These and other objects of my invention which will be set forth hereinafter or will be apparent to one skilled in the art upon reading these specifications, I accomplish by that procedure, in those constructions, and with those apparatus elements of which I shall now describe exemplary embodiments. Reference is made to the accompanying drawings, wherein:

In copending applications, Serial No. 695,143, filed September 6, 1946, and entitled Knocked Down or Folding Structures Made from Acetate Sheeting or the Like, now Patent No. 2,551,090, dated May 1, 1951, and Serial No. 788,788, filed November 29, 1947, and entitled Process of Making Knocked Down or Folding Structures Embodying Acetate Sheeting or the Like, I have taught a method of forming continuously articulated structures having panels of sheeting, where the lines of articulation extend in the same direction. In the practice of that invention, a supply of the sheeting is withdrawn from a roll and subjected to a slitting operation in which it is divided by lines of cut into a plurality of strips having respectively the width desired as the width of the articulated panels in the finished structure. When the sheeting has thus been divided, I next apply over the lines of division therein strips of a thin flexible material having sufficient strength and flexibility to act as a hinge. When the material, as so treated, is cut apart into desired lengths, articulated structures are provided. The sheeting employed may be any substances falling within the broad definition set forth above, and the thin flexible film may be any of the films of commerce whether of the same substance as the sheeting or not. The adhesive union may be brought about by the application of any suitable adhesive substance or by the application of a solvent for the substance of the sheeting or the substance of the film. As pointed out in the copending application, excellent results are cheaply secured by applying over the lines of cut in the sheeting, strips of cellophane coated with pressure sensitive adhesive, and merely pressing these strips firmly into contact with the sheeting. It is not beyond the scope of my procedure, however, to cover the entire surface of the slitted sheeting with a continuous layer of flexible film, although this is more expensive. If the substance of the sheeting is transparent, it is usually desired that the substance of the film shall be transparent also. It is further desirable to form these articulated structures in such a fashion that when they are bent, the strips or covering of flexible film lies to the outside of the lines of fold. This avoids raw edges of the sheeting at the outer surface of the box.

In the present invention, I employ procedures similar to those of the copending applications referred to; but I carry these teachings further by the association with articulated structures formed in this manner of other articulated structures forming other parts of the finished box, more particularly the ends thereof. These additional structures may be in some instances articulated structures of sheeting, formed in a fashion similar to that described for the formation of the body elements. In this event, my procedure and apparatus enable me to make boxes, all panels of which are formed from sheeting, and hence boxes the blanks for which are made up of panels of sheeting articulated together in a plurality of directions.

But for many purposes, I prefer to associate with carton bodies which are made up of articulated panels of sheeting, end pieces formed of boxboard or other scorable and bendable sheet material. In this way, I am able to make one-piece or plural-piece boxes, the body portions of which are formed of sheeting and hence are transparent, and which therefore are adapted for the effective display of merchandise. The use of boxboard or the like for end pieces in my boxes enables me to make structures having the advantage above, while at the same time, possessing any of the desirable features of the knock down paperboard box, including those features which are of advantage in setting up such boxes. The last mentioned features include the features of so-called automatic boxes. While I have not herein described all of the forms of boxes which may be made in accordance with my invention, it will be understood by the skilled worker in the art that the teachings of this invention are applicable to all types of folding cartons including those types known in the art as infold, knock down boxes.

Figures 1, 2, 3, 4, 5, 6:
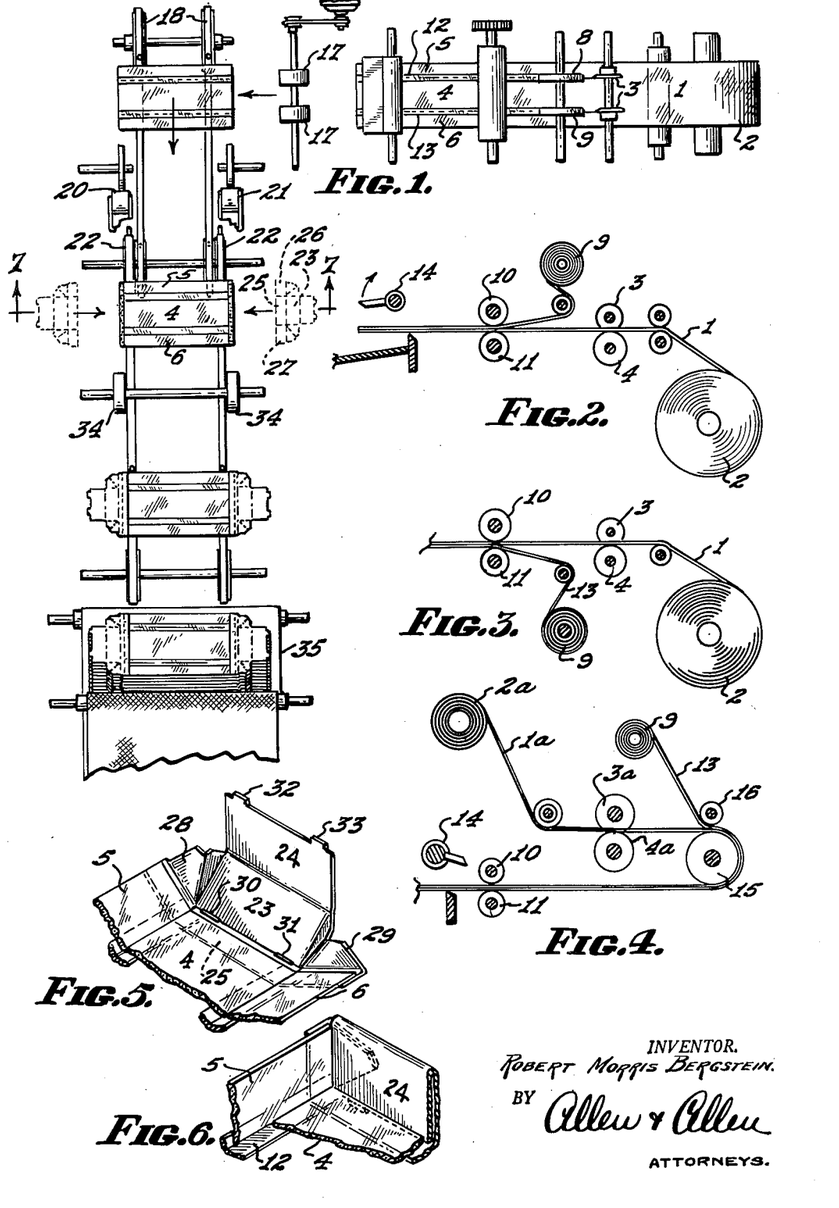
Figure 1 is a diagrammatic plan view of an apparatus for associating articulated elements in the production of boxes in accordance with my invention.
Figures 2, 3, and 4 are diagrammatic elevations of apparatus elements serving to form articulated structures from sheeting.
Figures 5 and 6 are partial perspective views showing stages in the setting up of a box element formed in accordance with the showings of the foregoing figures.

Referring to Figures 1 and 2, I have shown a web of sheeting 1 being withdrawn from a roll 2. As the sheeting is so withdrawn, it is slit as aforesaid by cooperating slitters 3 and 4. In the particular embodiment, the slitting divides the sheeting into sections, which in the finished container will form a bottom or top 4 and side walls 5 and 6. Strips of thin flexible film, from supply rolls 8 and 9 are applied over the lines of cut in the sheeting and are pressed thereagainst by pressure rolls 10 and 11 which also may serve as draw rolls for moving the sheeting. The applied hinge strips are indicated at 12 and 13. The treated sheeting may be cut to length as by a fly knife mechanism 14, and the articulated structures may either be stacked preparatory to subsequent use or may be passed directly into another and angularly related section of the machine as desired.

I have indicated above that it is desirable to provide articulated structures which are to be bent in directions to bring the hinge strips 12 and 13 to the outside of the lines of fold. Where the articulated structures are to pass directly into another machine section, it may be found desirable to position the strips 12 and 13 on the underside of the sheeting. This may be accomplished as shown in Figures 3 and 4.

In the first of these figures, the sheeting 1 being withdrawn from the roll 2 is slit at 3 and 4 and passes through the pinch rolls 10 and 11. The strips 12 and 13 are, however, brought up to the underside from their respective supply rolls. Where it is inconvenient to do this, the procedure shown in Figure 4 may be adopted. The sheeting 1a, taken from the roll 2a, may be slit as at 3a and 4a, and may have the strips 12 and 13 applied to its upper surface, as shown. The treated sheeting is then reversed in direction preparatory to cutting it apart by means of the fly knife 14. The reversal may be accomplished around a drum 15, against which a pressure roll 16 operates.

In the practice of Figure 1, the articulated sheeting structures are moved into a second section of the machine by means of transfer rolls 17. The second machine section has a conveyor 18, such as a chain and pin device for moving the articulated structures in timed relationship. Adhesive applying devices 20 and 21 are employed in this section to coat the end portions of the articulated sheeting structures with adhesive. The conveyor 18 terminates intermediate the length of the second section of the machine, and the articulated structures are picked up by a second conveyor 22, the pins of which are somewhat displaced so that at a station in the machine where the end pieces are to be associated with the articulated bodies, these bodies come temporarily to rest.

In the particular embodiment, the end pieces are paperboard structures cut and scored to form end wall elements 23 bearing inturnable flaps 34. Very shallow sections 25, 26, and 27 (the first of which is articulated to the end wall panel 23) are provided for attachment to the ends of the panels 4, 5, and 6 of the body portions with the lines of fold between the shallow sections 25, 26, and 27 in alignment with the lines of articulation in the sheeting panels 4, 5 and 6 as defined by the hinge strips 12 and 13. Webs 28 and 29 connect the ends of the end wall panel 23 with the edges of sections 26 and 27. As most clearly shown in Figure 5, I may form slots 30 and 31 along the line of articulation between the end wall panel 23 and the member 25, and I may provide the flap 24 with shallow tongues 32 and 33 to engage in these slots. It will be noted that the end pieces are scored in a plurality of directions, the scores being indicated in dotted lines.

Figures 7, 8, 9, 10, 11:
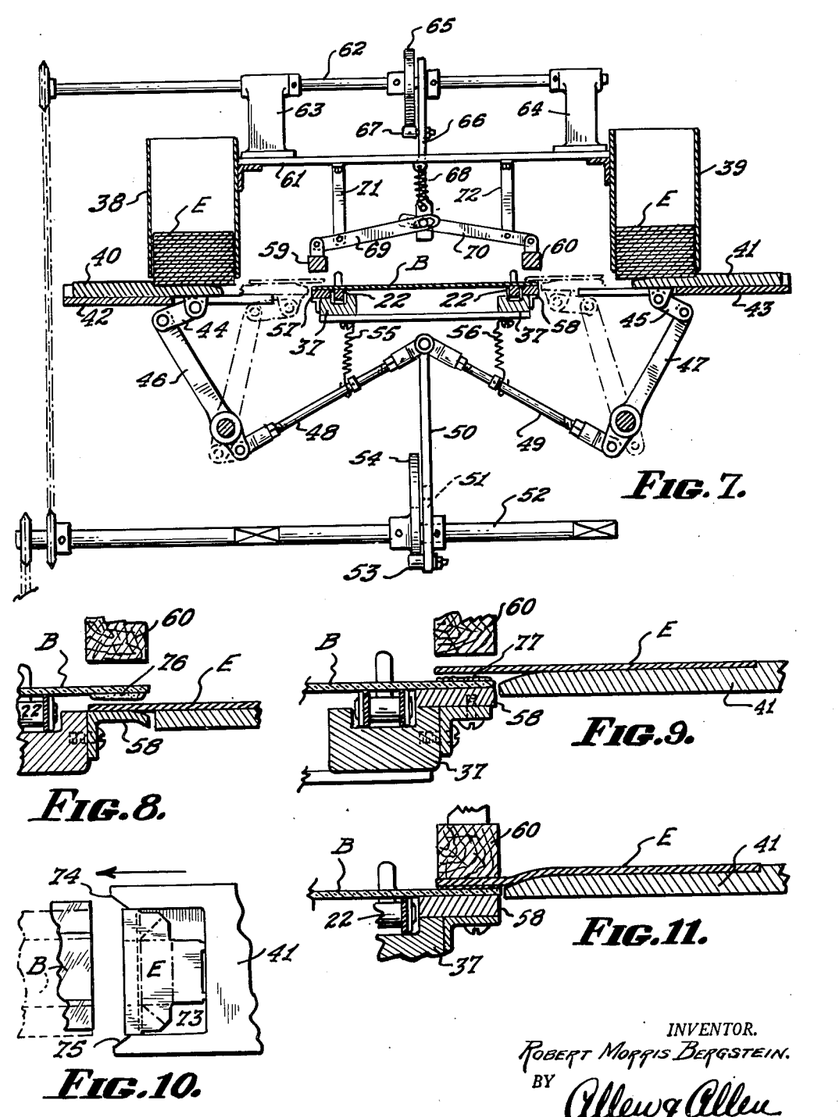
Figure 7 is a sectional view of that portion of the apparatus of Figure 1 which is concerned with the juxtaposition and adhesive union of articulated elements and is taken along the section line 7—7 of Figure 1.
Figure 8 is a partial sectional view showing the relationship of box elements and means for their attachment where an end element is attached below a body element.
Figure 9 is a similar partial section showing an operation in which the end element is attached above the body element.
Figure 10 is a partial plan view showing the engagement of an end element in a moving and positioning means.
Figure 11 is a partial sectional view related to Figure 9 showing the parts being pressed together.

The combining is done at a point in the second section of the machine of Fig. 1, which is marked by the section lines 7—7. At this point, the body member with adhesive applied to its ends comes to rest. The end pieces are moved in laterally, and associated with the body piece, with the score lines between the shallow sections 24, 25, and 26 in alignment with the lines of articulation in the sheeting panels. Thereupon, the second conveyor 22 picks up the combined structure and carrying it, if desired, through one or more sets of upper and lower pressure rolls 34, delivers it to a stacking mechanism generally indicated at 35.

From Figures 5 and 6, it will be evident that the box structure formed in the fashion just described is of a type known as a bellows-fold overlapped end box. It differs from the boxes hitherto known in commerce, however, in that the body panels including the bottom 4 and side walls 5 and 6 are formed of sheeting panels articulated together. These panels are preferably transparent. The formed structures are useful as either part of a two-piece construction or as a tray in which articles of merchandise may be positioned, the whole being wrapped with a transparent wrapper, as indicated at 36 in Figure 15. The sheeting panels may be so associated with the paperboard end pieces that the ends of the sheeting panels fall short of the score line demarking portions 25, 26 and 27 of the end pieces from the remainder thereof, so that, as clearly shown in Figure 6, the edges of the inturned flap 24 may engage behind these edges as abutments.

For a mechanism whereby the end pieces may be associated with the body elements reference is made to Figures 7 to 10. Here a body blank B is shown in position prior to its being picked up by the pins on the conveyor chains 22 which ride in tracks 37 on the bed of the machine. The end pieces E are shown as stacked in hoppers 38 and 39 at each side of the machine. At each side of the machine also, there is a horizontally slidable feeding and positioning means 40 and 41 mounted on slides 42 and 43, respectively. These members are capable each of receiving one of the end pieces, removing it from its stack, moving it inwardly toward the main portion of the machine section and positioning it for adhesive union with the body blank B. This is indicated in dotted lines in the figure.

For moving the elements 40 and 41, I connect them by links 44 and 45 to the ends of levers 46 and 47 pivoted to the frame of the machine. The other ends of these levers are connected by links or rods 48 and 49, from the pivoted connection of which depends a rod 50. This rod is slotted as at 51 to accept a driven shaft 52 in the machine. The lower end of the bar 50 bears a cam follower 53 which rides on a cam 54 affixed to the shaft. Rotation of the shaft will cause the cam to move the bar 50 up and down, thereby actuating the sliding members 40 and 41. Springs 55 and 56 are employed to bias the sliding members to the position shown in solid lines and to keep the cam follower in contact with the cam.

When the body blank B comes to rest, its edges, as shown, lie above lower pressure elements or anvils 57 and 58. As soon as the end pieces have been positioned as shown in dotted lines, upper pressure elements 59 and 60 are brought downwardly to clamp the end pieces E and the body blank B together, so as to bring about a strong adhesive union.

A bridge element 61 is shown as extending across between the hoppers 38 and 39. An upper shaft 62 is journaled in brackets 63 and 64 on this bridge element. The shaft may be driven in any suitable fashion but is shown as connected by a chain and sprockets to the shaft 52. A cam 65 is fixed on the shaft 62. A vertically reciprocable bar 66 having a slot to accept the shaft is provided with a cam follower 67 and is biased by a spring 68 in such a fashion as to keep the cam follower against the cam. The upper pressure elements 59 and 60 are mounted upon the ends of levers 69 and 70 which are pivoted to brackets 71 and 72 extending downwardly from the bridge. The other ends of the levers are slotted and pivoted to the bar 66. The shafts 52 and 62 are driven in timed sequence to the movements of the body blanks B.

The sliding elements such as 41 in Figure 10 may be provided with a recess 73 to accept and position the end pieces E. Sidewise portions of the sliding member may be provided with curved or arcuate ends 74 and 75 which will act to correct any misalignment of the body blank B. In this fashion, exact registry of the parts may be attained prior to the exertion of pressure on them.

In the employment of my machine, it is possible to position and adhere the end pieces E either above or below the body blanks B. In the latter event, the end pieces are brought out so that the front edge rides over and is supported by the anvil member 58. The body blank B which has been coated on the underside with adhesive 76 comes to rest with its end above the edge of the end piece as shown in Figure 8. Pressure is then exerted as has been described. In the opposite positioning of parts as shown in Figures 9 and 11, the edge of the end piece E is positioned above the body blank B which is coated on its upper side with adhesive as at 77. Bringing the pressure element 60 downwardly as has been described will press the parts together as is illustrated in Figure 11.

Figures 12, 13, 14, 15:
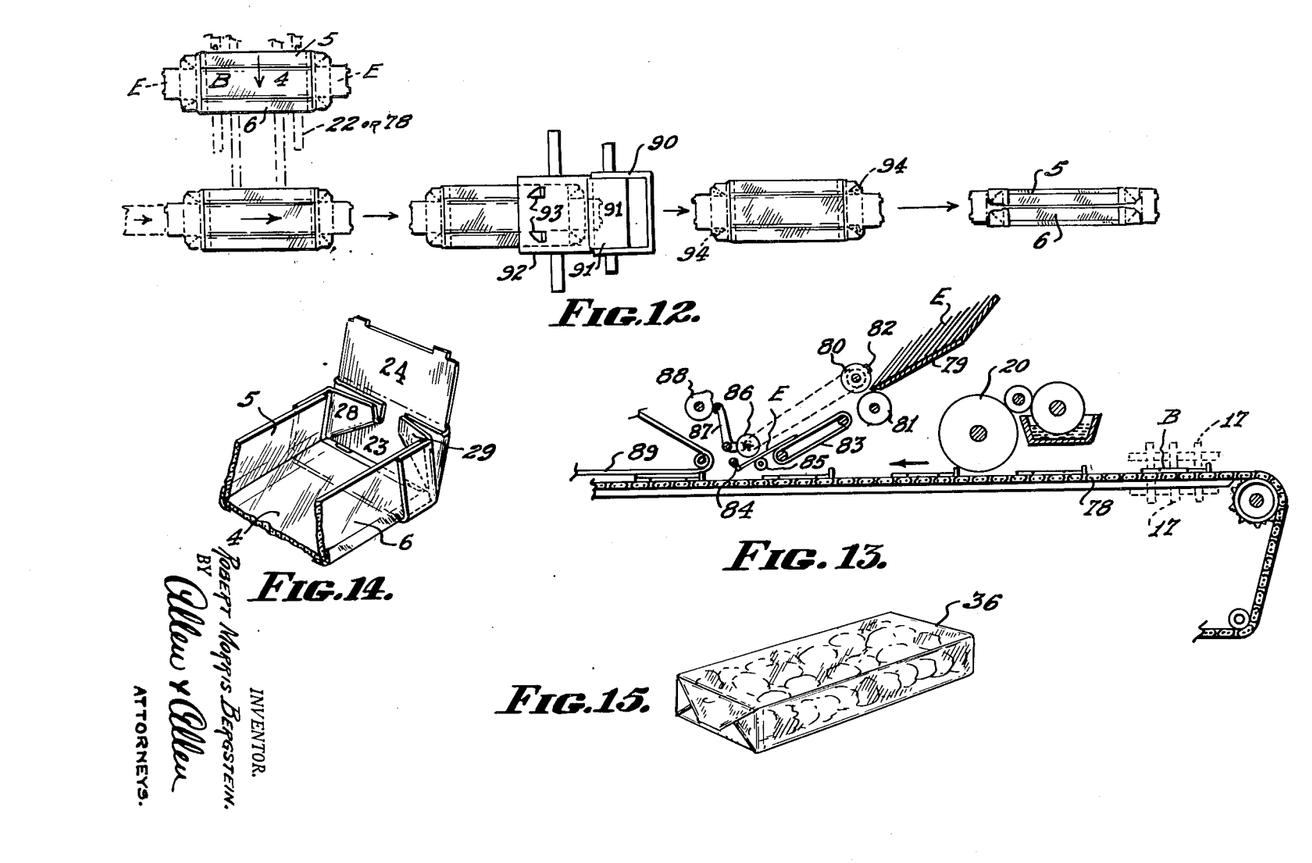
Figure 12 is a partial plan view showing in a sequence of operations the formation of another type of box.
Figure 13 is a partial plan view of machine elements related to the operations shown in Figure 12.
Figure 14 is a partial perspective view of a box element of the automatic type in the course of being set up.
Figure 15 is a perspective view of a wrapped package.

While I have described a mode of operation in which the end pieces are brought inwardly from the sides of the machine and in which the body blanks B come to rest to receive them, I may employ for the purpose other types of apparatus. In Figure 13, I have diagrammatically shown a type in which the end pieces move in the same direction as the body blanks and in which the association of these parts is accomplished during the movement of the body blanks and end pieces. Here the body blanks B are transferred to a conveyor 78 in the second section of the machine by the transfer rolls 17. An adhesive applying mechanism is shown at 20. The end pieces E are stacked in an overhead conveyor 79 from which they are withdrawn one by one by a pair of coacting rolls 80 and 81, the upper of which carries a frictional withdrawing means such as a block of rubber 82. The end pieces as so withdrawn pass downwardly aslant on a conveyor 83 and come to rest against a rotary stop 84. Beneath the end piece in this position, there is a driven frictional shaft or roller 85. An upper roller 86 is mounted on a bell crank 87 and is actuated by a cam 88. Elements 80, 84 and 88 are driven in timed relationship with the movements of the body blanks B on the conveyor 78. When one of these blanks comes to the proper position the stop 84 turns out of the way, the roller 86 descends, pressing the blank against the driven shaft 85, and the blank E is fed to the blank B in the proper position and at the proper time for adhesive union. The joined blank structures next pass beneath a pressure device such as the belt 89. The mechanism just described is analogous to mechanism shown for a different purpose in Patent 2,145,682. It will be understood that where a pair of end pieces are to be attached to a body blank, the mechanism just described will be duplicated at each side of the machine.

In Figure 12, I have diagrammatically illustrated additional steps in the formation of an automatic knock down box. An assembled body and end piece structure made by any of the methods set forth above is delivered from the conveyor 22 or 78 to a third angularly related machine section. In this section a timed spot gluing apparatus comprising a glue pot 90, transfer roll 91, and glue roll 92 with glue printing faces 93, operates in such a fashion as to apply adhesive as at 94 to the inner triangular halves of the bellows-folding corner webs. During a continuation of the motion of the blank its side walls 5 and 6 together with the attached webs are folded inwardly as shown at the extreme right in Figure 12. The folding is accomplished by the usual stationary sweeps (not illustrated). The folded blank may then be subjected to pressure elements and stacking means as is usual in the art.

The result as shown in Figure 14 is the provision of an automatic box, though still of the overlap end style. The result of raising the side walls 5 and 6 will be to erect the end panel 23, causing the bellows portions 28 and 29 to fold along their diagonal score lines. The flap 24 may then be inturned and locked as above described.

Figure 12 is merely illustrative of types of spot gluing and folding operations to which cartons formed in accordance with my invention may be subjected. It will be understood that my procedures provide fully articulated blanks for cartons, which blanks may be handled, folded, and glued on the various available folding instrumentalities. Hence, my cartons may be made in the various styles hitherto known for folding cartons, and may be folded and glued in all of the fashions and on all of the machines hitherto current in the art.

Figures 16, 17, 18:
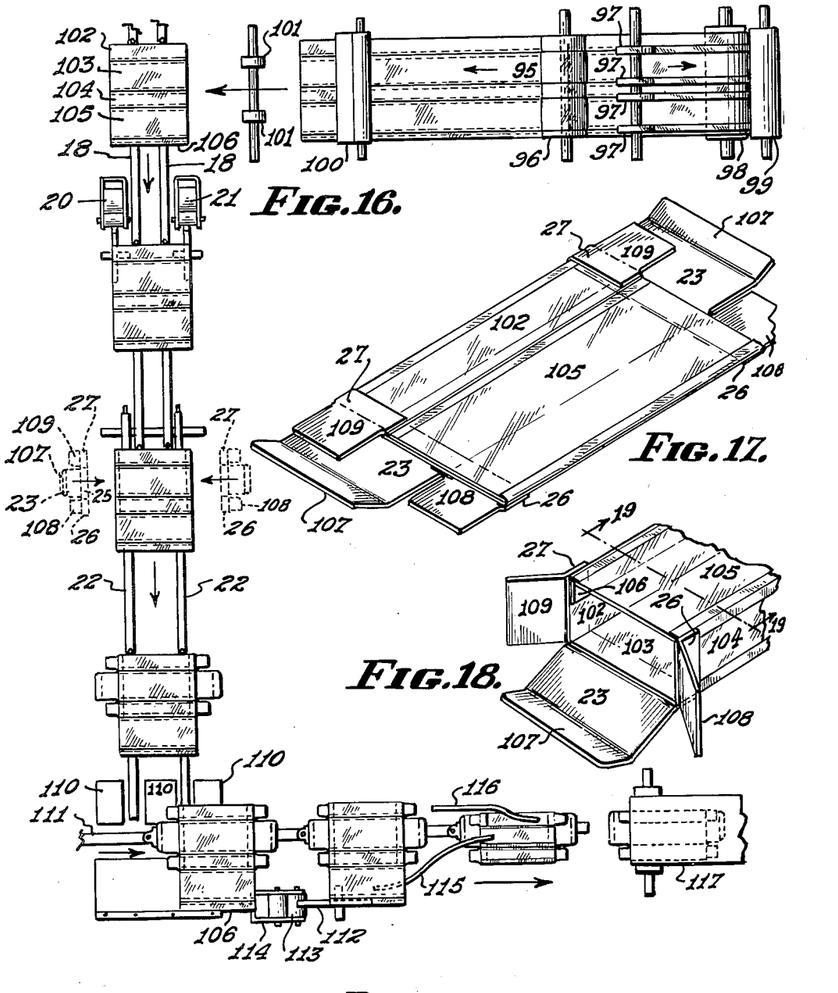
Figure 16 is a diagrammatic plan view showing steps and elements employed in the making of a tubular folding carton in accordance with my invention.
Figure 17 is a perspective view of the finished carton so formed.
Figure 18 is a partial perspective view of the erected carton.

My process also contemplates the manufacture of tubular knocked down boxes of types hitherto known in the art as "one-piece cartons." In Figure 16, a web 95 is withdrawn from a roll (not shown) and passing toward the right in the upper part of the figure is subjected to the action of slitting means 96. Strips of film from rolls 97 are applied to the slitted web in such a fashion as to cover the lines of cut, as has been described, and the treated web is reversed around a pressure roll combination 98, 99. The treated web is then cut apart into pieces of desired length by a fly knife 100. The pieces are delivered by transfer rolls 101 to a second section of the machine.

The pieces now consist of articulated panels of sheeting configured to present a series of enclosing body walls 102, 103, 104, 105 and a glue flap 106. The pieces may be picked up by the conveyor 18, subjected to the action of the glue applying device 20 and 21 and brought to a position of rest at the termination of the conveyor as hereinabove described. At this point, end pieces are applied and adhesively secured which again may be done by any of the mechanisms set forth above. The end pieces in the exemplary embodiment are similar to those described in that they provide an end wall 23 and members 25, 26, and 27 for attachment to end portions of contiguous walls of the body blank. The end panel 23, however, bears a tuck flap 107, while the portions 26 and 27 carry flaps 108 and 109, as shown. The ultimate carton will be of the standard tuck end type. The tuck flap 107 will be tucked inside the sheeting panel 105 so that no portion of the end piece need be attached to this panel.

Figure 19:
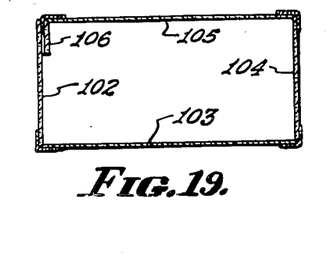
Figure 19 is a transverse sectional view thereof taken along the line 19—19 of Figure 18.

When the complete carton blank has been assembled as above described it is picked up by the conveyor 22. The blanks may be handled in any way desired, but it is convenient at this point to transfer them to a third angularly related section of the machine by means of transfer rolls 110. This last machine section is in structure and effect similar to known machines for tubing carton blanks. It comprises a conveyor 111 by which the blanks are moved. During the movement a suitable adhesive is applied to the glue flap 106 by an applicator 112 contacting one or more transfer rolls 113, the last of which turns in a pan 114. Since at this point I am adhering a sheeting surface to a sheeting surface, I may do so either by means of an applied adhesive or by means of an applied solvent for the substance of the sheeting. When the glue flap has been treated for adhesion, the blank is then folded by stationary sweeps 115 and 116 as is usual in carton practice, and is brought into a suitable pressure stacker 117 or the like. Figures 17, 18, and 19 illustrate the structure of the completed box.

Figures 20, 28, 29:
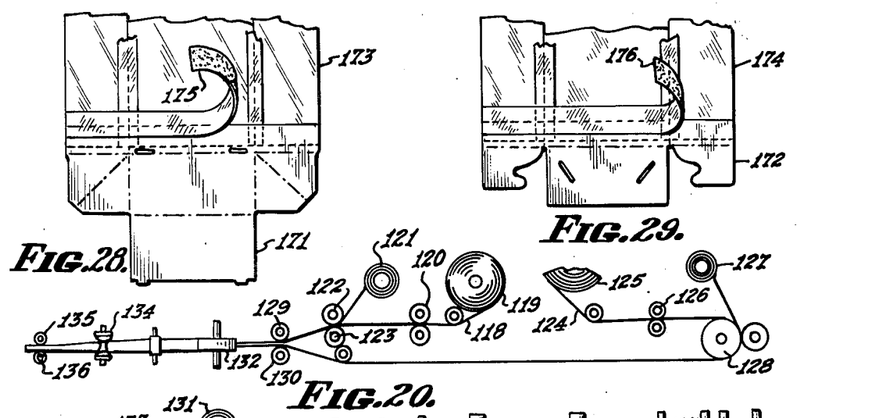
Figures 20 and 21 are respectively diagrammatic elevational and plan view of apparatus for making a tubular body of sheeting.
Figures 28 and 29 are partial plan views illustrative of another mode of associating end pieces with body pieces in the formation of my cartons.
Figure 21:
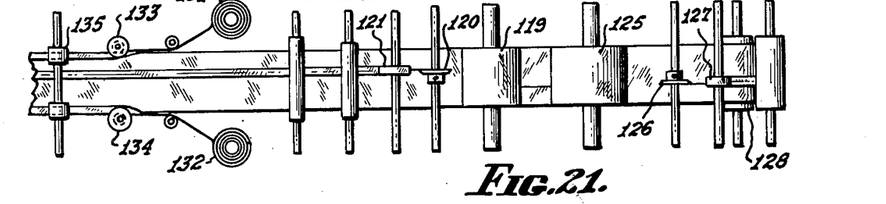
Figures 22, 23:
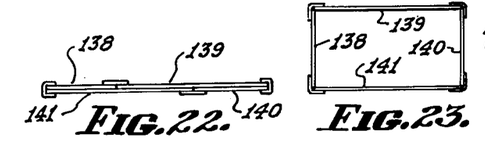
Figures 22 and 23 are end views of the tubular body respectively in collapsed and in erected condition.
Figures 24, 25, 26:
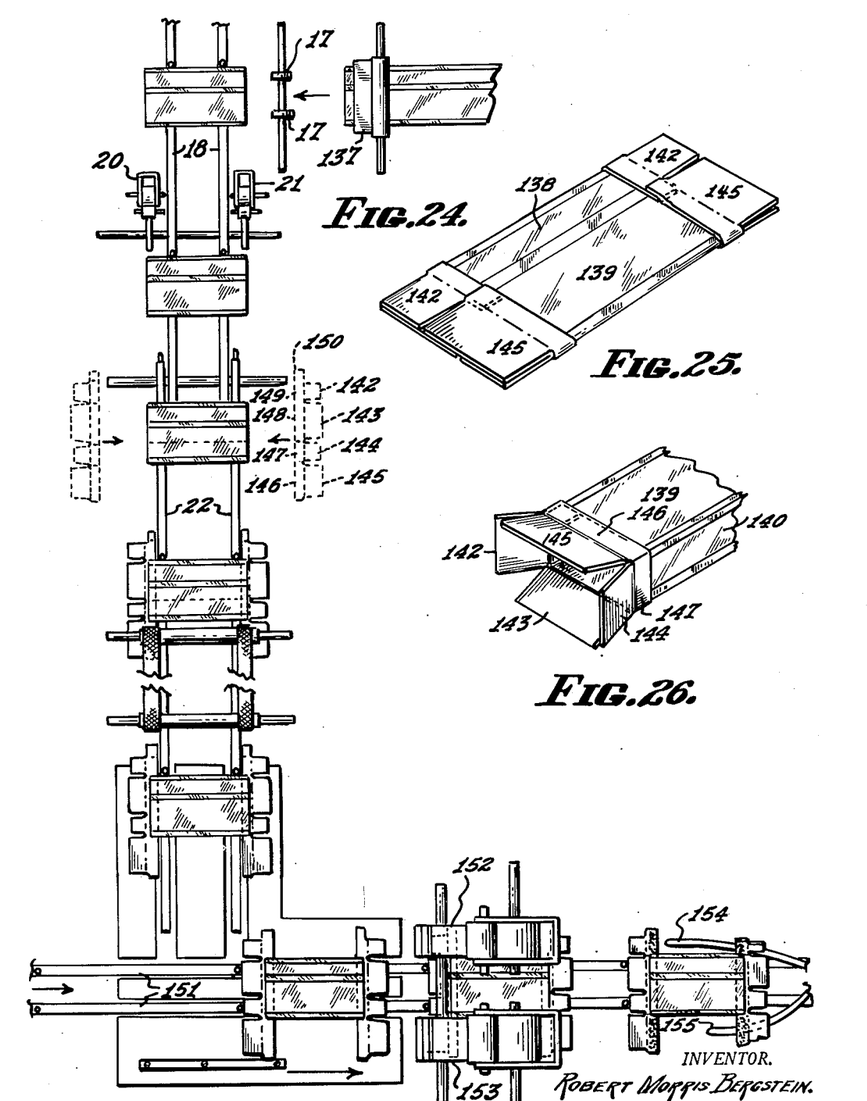
Figure 24 is a plan view of a machine showing another type of operation in the formation of tubular collapsed cartons.
Figure 25 is a perspective view showing a tubular carton as formed in the apparatus of Figure 24 in the collapsed condition.
Figure 26 is a partial perspective view showing the carton in erected condition.

A variant way of making tubular cartons, comprises the steps of forming a tubular body prior to the association of end pieces therewith. A way of forming suitable tubular bodies consisting of articulated sheeting panels is set forth in my copending application referred to herein. In Figures 20 and 21, I have illustrated such an operation. A web of sheeting 118 is withdrawn from a roll 119 and is slit as at 120 to divide it in such fashion as to permit it to form a pair of the enclosing body walls of the carton. The line of cut is next covered with a strip of film-like material from a roll 121 and the treated web passed through pressure rolls 122 and 123. Another web 124 of the sheeting is withdrawn from a roll 125 and is slit as at 126 to form the other body walls of the tubular structure. The line of cut is covered with a strip of film-like substance from a roll 127. This treated web is then reversed around a roll 128 and the two treated webs are brought together through pinch rolls 129 and 130. Next the superposed treated webs are taped together at their edges with strips of film-like substance withdrawn from rolls 131 and 132. The strips are smoothed into place by rollers 133 and 134 or other suitable means, and the structure is then passed through a pinch roll combination 135, 136. Reference to Figure 24 will show how the tubular body may be cut into lengths as by a fly knife 137, the lengths being transferred to an angularly related section of the machine by transfer rolls 17. The nature of the tubular bodies is shown in Figures 22 and 23. The enclosing body walls are indicated at 138, 139, 140, and 141. It will be observed that there is in this construction no glue flap. While I have shown a tubular body having four walls, it will be understood that the body may be so constructed as to have a larger number of walls as may be desired for special purposes, so long as the assembly of articulated walls gives a tubular structure which may be folded flat. Thus, I may form hexagonal or octagonal cartons by the method herein set forth.

In the second section of the machine the association of end pieces with the tubular bodies is substantially the same in mechanism and procedure as that which has already been described. The tubed bodies may be moved along (Figure 24) by the conveyor 18 and treated with adhesive, as at 20 and 21, and brought to rest at the end of the conveyor. The exemplary embodiment illustrated involves the formation of a tubular carton of the seal end variety involving four seal end flaps. Consequently, the end pieces are designed to supply these flaps at 142, 143, 144, and 145. These flaps are articulated to a narrow strip-like element divided by suitable score lines into portions 146, 147, 148 and 149, together with an attachment or glue tab 150. The end pieces as illustrated will be attached to one side of the tubular bodies with the seal end flaps 143, 144 lying at the ends of appropriate body walls. The assembled structure will then be picked up by the conveyor 22 and delivered to a third section of the machine.

It will be understod that it is now necessary to tube the end pieces about the ends of the already tubed body pieces. A conveyor 151 in the third section of the machine moves the structures in the direction of the arrow. Glue printing devices 152 and 153 apply adhesive to portions 146, 149 and 150 of the end pieces whereupon stationary sweeps 154 and 155 tube the end pieces. The delivered cartons are passed to a suitable stacker.

Figures 25 and 26 illustrate the finished exemplary box. The method and apparatus just described are, of course, suitable for the manufacture of other types of tubular cartons than the seal end style.

Figure 27:
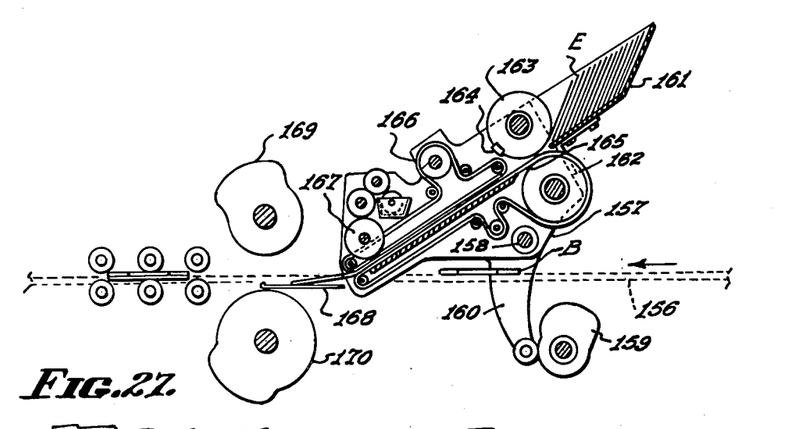
Figure 27 is a sectional view of a portion of a machine for associating end members with body members in the formation of my cartons.

Another type of apparatus which may be used in applying end pieces is shown in Figure 27. Here while the body structures B are moving along a conveyor 156, end pieces E are fed downwardly from above to a support located beneath the path of travel of the body members. A frame 157 is pivoted as at 158 and is rocked by a cam 159 bearing on an arm 160 attached to the frame. The end pieces are held in a hopper 161 on the frame and are fed out one by one by means of rolls 162 and 163, the latter of which carries a frictional feeding means 164. The end pieces pass downwardly on a conveyor 165 and are gripped from above by a belt 166. Adhesive may be applied to them if desired by application means generally indicated at 167.

The operation and timing of the mechanism is such that at the intervals between the passage of body members B along the conveyor 156, the forward end of the frame tilts downwardly and the conveyors deposit an end piece on a support 168 lying beneath the path of travel of the body pieces. The support properly locates the end piece; and the frame next tilts out of the way to permit the passage of the body piece. When the body piece gets to the proper position, a pair of timed, configured pressure rolls 169 and 170 come into effective operation. The latter of these rolls lifts the end piece from the support 168 and brings it against the body element which lies above it. The pressure rolls then coact to press the body piece and the end piece together over the areas of contact.

End pieces may be attached to body pieces in the formation of my cartons in other ways. In Figures 28 and 29 I have shown end pieces 171 and 172 attached to body pieces 173 and 174 by means of tapes 175 and 176. The end pieces may be lapped over the ends of the panels of the body pieces as shown in Figure 28 or they may simply be butted against the ends of the body panels as shown in Figure 29.

Other modifications may be made in my invention without departing from the spirit of it. Having thus described my invention in certain exemplary embodiments, what I claim as new and desire to secure by Letters Patent is:

1. In a knock-down box structure, a plurality of panels of non-scorable sheeting hingedly articulated together by means of a flexible film-like substance covering the lines of separation between said panels, certain of said panels forming side walls for the box, and paperboard structures attached to the ends of panels in said assembly, said paperboard structures comprising relatively narrow attachment means secured to a plurality of said sheeting panels and end closure members articulated to a plurality of said attachment means for forming end structures of the box.

2. The structure claimed in claim 1 wherein said assembly comprises three panels of sheeting and wherein said end closure members comprise a paperboard panel for forming an end wall and means for holding the end and side walls in erected relationship.

3. The structure claimed in claim 1 wherein said assembly comprises three panels of sheeting and wherein said end closure members comprise a paperboard panel for forming an end wall and means for holding the end and side walls in erected relationship, said end panel being articulated to an intermediate one of said sheeting panels, and said means for holding said panels in erected relationship comprising inturnable means articulated to the remaining sheeting panels and an inturnable flap articulated to said end wall panel.

4. The structure claimed in claim 1 wherein said assembly comprises three panels of sheeting and wherein said end closure members comprise a paperboard panel for forming an end wall and means for holding the end and side walls in erected relationship, said end panel being articulated to an intermediate one of said sheeting panels, and said means for holding said panels in erected relationship comprising inturnable means articulated to the remaining sheeting panels and an inturnable flap articulated to said end wall panel, the ends of said sheeting panels terminating short of the lines of articulation of said attachment means to said end closure members whereby to form abutments behind which the edges of said inturnable flap may engage.

5. The structure claimed in claim 1 wherein said assembly comprises three panels of sheeting and wherein said end closure members comprise a paperboard panel for forming an end wall and means for holding the end and side walls in erected relationship, said end panel being articulated to an intermediate one of said sheeting panels and said means for holding said panels in erected relationship comprising inturnable means articulated to the remaining sheeting panels and an inturnable flap articulated to said end wall panel, said inturnable means articulated to said side wall panels being bellows folds connecting attachment means on said side wall panels with edge portions of said end wall panel.

6. In a knock-down box structure, a plurality of panels of non-scorable sheeting hingedly articulated together by means of a flexible film-like substance covering the lines of separation between said panels, certain of said panels forming side walls for the box, and paperboard elements attached to the ends of panels in said assembly, said paperboard elements comprising relatively narrow attachment means and members articulated thereto for forming end structures of the box, said assembly of articulated sheeting panels including panels to form the enclosing body walls of a tubular collapsible box, plus an attachment flap, and said paperboard structures each including attachment means for juncture to at least three of said sheeting panels, and closure flaps articulated to each of said attachment means.

7. In a knock-down box structure, a plurality of panels of non-scorable sheeting hingedly articulated together by means of a flexible film-like substance covering the lines of separation between said panels, certain of said panels forming side walls for the box, and paperboard elements attached to the ends of panels in said assembly, said paperboard elements comprising relatively narrow attachment means and members articulated thereto for forming end structures of the box, said assembly of articulated sheeting panels including panels to form the enclosing body walls of a tubular collapsible box, plus an attachment flap, and said paperboard structures each including attachment means for juncture to at least three of the said sheeting panels, and closure flaps articulated to each of said attachment means, one of said closure flaps bearing an articulated tuck flap.

8. In a knock-down box structure, a plurality of panels of non-scorable sheeting hingedly articulated together by means of a flexible film-like substance covering the lines of separation between said panels, certain of said panels forming side walls for the box, and paperboard elements attached to the ends of panels in said assembly, said paperboard elements comprising relatively narrow attachment means and members articulated thereto for forming end structures of the box, said assembly of articulated sheeting panels constituting a collapsed tubular structure, said paperboard elements having their attachment means in the form of articulated bands with an overlap for surrounding end portions of all of said sheeting panels, said closure means comprising closure flaps articulated to said attachment means.

ROBERT MORRIS BERGSTEIN.

REFERENCES CITED

The following references are of record in the file of this patent:

UNITED STATES PATENTS

| Number | Name | Date |
| --- | --- | --- |
| 1,038,377 | Jagenberg | Sept. 10, 1912 |
| 1,041,554 | Worcester | Oct. 15, 1912 |
| 1,067,948 | Streit | July 22, 1913 |
| 1,174,012 | Bristol et al. | Feb. 29, 1916 |
| 1,293,782 | Hren et al. | Feb. 11, 1919 |
| 1,627,812 | Smith | May 10, 1927 |
| 2,022,371 | Eisenlohr et al. | Nov. 26, 1935 |
| 2,056,969 | Inman | Oct. 13, 1936 |
| 2,130,019 | Meier | Sept. 13, 1938 |
| 2,145,682 | Bergstein | Jan. 31, 1939 |
| 2,214,813 | Guyer | Sept. 17, 1940 |
| 2,233,207 | Gillam | Feb. 25, 1941 |
| 2,256,888 | Bergstein | Sept. 23, 1941 |
| 2,551,090 | Bergstein | May 1, 1951 |

FOREIGN PATENTS

| Number | Country | Date |
| --- | --- | --- |
| 686,250 | France | Apr. 8, 1930 |